United States Patent Office 2,923,179
Patented Feb. 2, 1960

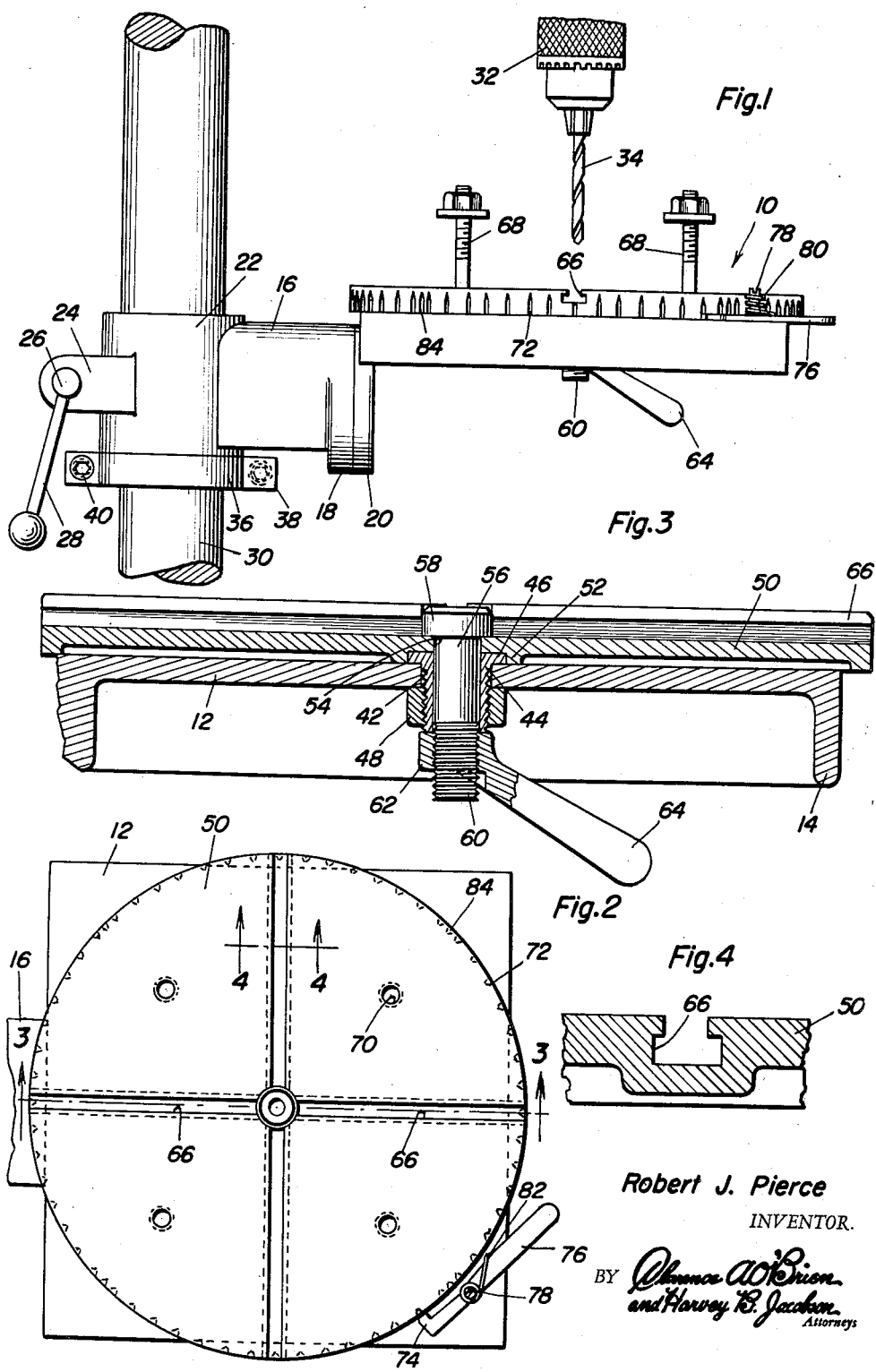

2,923,179

INDEX PLATE FOR DRILL PRESS

Robert J. Pierce, Radford, Va.

Application June 30, 1958, Serial No. 745,525

1 Claim. (Cl. 77—64)

The present invention generally relates to an index table and more particularly an index table adapted to fit various types of drill presses and which is extremely light and inexpensive to manufacture, easy and very simple to operate without spending excessive time in layout, versatile in that it may be used on many drill presses that do not have revolving tables, tiltable with the original drill table to permit drilling at different angles, easy to attach and accurate and versatile in operation.

In conventional drill presses, a drill table is provided which is sometimes tiltable and is vertically adjustable on a drill column. The drill table is adjustable by loosening a clamp and sliding the drill table to the desired elevation and then tightening the clamp for locking the drill table to the column and the tilting adjustment is also accomplished by loosening a clamp mechanism. While the drill table is effective for certain drilling operations, any type of operation requiring several drilling operations on a workpiece which is rigidly attached to the drill press table is extremely difficult to accomplish inasmuch as the workpiece cannot be accurately located in relation to the drill. Therefore, it is the primary object of the present invention to provide an index table for attachment to the drill table of conventional drill pieces so that a workpiece or a multiplicity of workpieces may be sequentially moved in relation to the drill and accurately located in relation to the drill by the index plate for facilitating the drilling of a series of holes in a single workpiece or in a multiplicity of workpieces.

A further object of the present invention is to provide a clamp for the drill press column upon which the drill table clamp rests thus permitting the drill table clamp to be loosened so that the drill table and the index table may swing freely about a vertical axis formed by the column without any change in elevation of the drill table or index table.

Another very important feature of the present invention is to provide an index table having index positions together with a latch mechanism for locking the index plate in index position with the index positions being arranged so that it may be indexed into anything divisible into 60 with the index positions also being provided with four extra positions to permit an index of eight or an octagon thereby providing a highly versatile index table which may be indexed to any number that can be divided into 60 or permit an index of eight or an octagon.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of the present invention illustrating portions of the conventional drill press;

Figure 2 is a plan view of the index table and the drill press table;

Figure 3 is a vertical sectional view taken substantially upon a plane passing along section line 3—3 of Figure 2; and Figure 4 is a sectional view taken substantially upon a plane passing along section line 4—4 of Figure 2.

Referring now specifically to the drawings, the numeral 10 generally designates the index plate of the present invention which is mounted on a conventional drill press table 12 having a depending peripheral flange 14 and which is attached to a laterally extending support arm 16 by a pair of plates 18 and 20 one of which is attached to the arm 16 and the other of which is attached to the drill press table 12 for enabling tilting movement of the drill press table 12 about the radial axis of the arm 16 with the details of this mechanism being eliminated. The drill press arm 16 is provided with a clamp 22 with projecting ears 24 and a clamp screw 26 and an operating arm 28 for releasing the clamp 22 thereby enabling the drill press table 12 to be elevated on the drill press column 30. The drill press base and the head is not illustrated since this is conventional structure but there is illustrated a drill press chuck 32 having a drill 34 mounted therein in a normal orientation in relation to the drill press table 12.

Mounted under the clamp 22 is a two-piece clamp 36 each having projecting ears 38 with clamp screws 40 extending therethrough thus providing a clamp collar for engagement with the column 30 underneath the clamp 22 whereby the clamp 22 may be loosened and the arm 16 and drill press table 12 rotated about the vertical axis of the column 30.

The drill press table 12 is provided with an aperture 42 at the center thereof receiving an externally threaded bushing 44 having a peripheral flange 46 at its upper end and a clamp nut 48 threaded on its lower end for rigidly clamping the bushing 44 to the drill press table 12 and extending through the opening 42.

A circular fixture plate 50 is provided with a depending annular flange 52 at the center thereof engaging the peripheral edge of the flange 46 on the bushing 44. The fixture plate 50 is also provided with a central opening 54 receiving an elongated bolt 56 having an enlarged headed end 58 and a threaded lower end 60. A clamp nut 62 is provided on the lower end 60 with the nut 62 having an offset handle 64 which could also be in the form of a knob. The clamp nut 62 engages the lower end of the bushing 44 and by loosening and tightening of the nut 62, the fixture plate 50 may be clamped in any position about the vertical axis of the bolt 56.

The top surface of the fixture plate 50 is provided with intersecting T-shaped slots 66 for receiving T headed clamp bolts 68 in an adjustable manner with the clamp bolts 68 being used to clamp a workpiece (not shown) to the fixture plate 50. The fixture plate 50 is also provided with tapped holes or sockets 70 in each quadrant thereof also for holding work.

The peripheral edge of the plate 50 is provided with a series of notches 72 for engagement by the pointed end 74 of a latch member 76 mounted pivotally on a pivot pin 78 and provided with an axial coil spring 80 having one end rigid with the pin 78 and the other end 82 engaged with the inner surface of the latch member 66 thus urging the dog end 74 of the latch member 76 into engagement with the notches 72. By manual pressure on the latch member 76, the pointed or dog end 74 may be released from the notches 72 for rotation of the plate 50 in any desired position so that the pointed end 74 may engage another notch or the handle 64 rotated to clamp the plate in adjusted position. It is pointed out that 60 index notches are provided around the outside rim for indexing into any number that can be divided into sixty with four extra notches 84 being provided to permit an index of eight or an octagon.

While the device may have any suitable dimensions, it has been found that a fixture plate 11 inches in diameter, ⅞ inch thick, having 60 index notches plus four extra notches with the T-slots being ⅜ inch in width and the holes 70 being ⅜ inch drilled and tapped holes is effective.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In combination with a drill press table, a circular index plate, means mounting the index plate on the drill press table for rotation about a vertical axis including a tubular bushing extending through the drill press table and having a peripheral upper end flange seating on the drill press table, a lock nut threaded on said bushing under and against said drill press table for rigidly securing said bushing to said drill press table, a pivot bolt extending through the index plate and bushing, a manual clamp nut on the lower end of the pivot bolt engaging the bushing for locking the plate in adjusted position, and a circular annular bottom flange on said index plate integral therewith and receiving said peripheral flange and rotatably fitting thereon.

References Cited in the file of this patent

UNITED STATES PATENTS

| | | |
|---|---|---|
| 1,923,440 | Hunt et al. | Aug. 22, 1933 |
| 2,380,314 | Kavle | July 10, 1945 |
| 2,638,800 | Frushour | May 19, 1953 |

FOREIGN PATENTS

| | | |
|---|---|---|
| 570,018 | Great Britain | June 19, 1945 |